United States Patent Office 3,514,899
Patented June 2, 1970

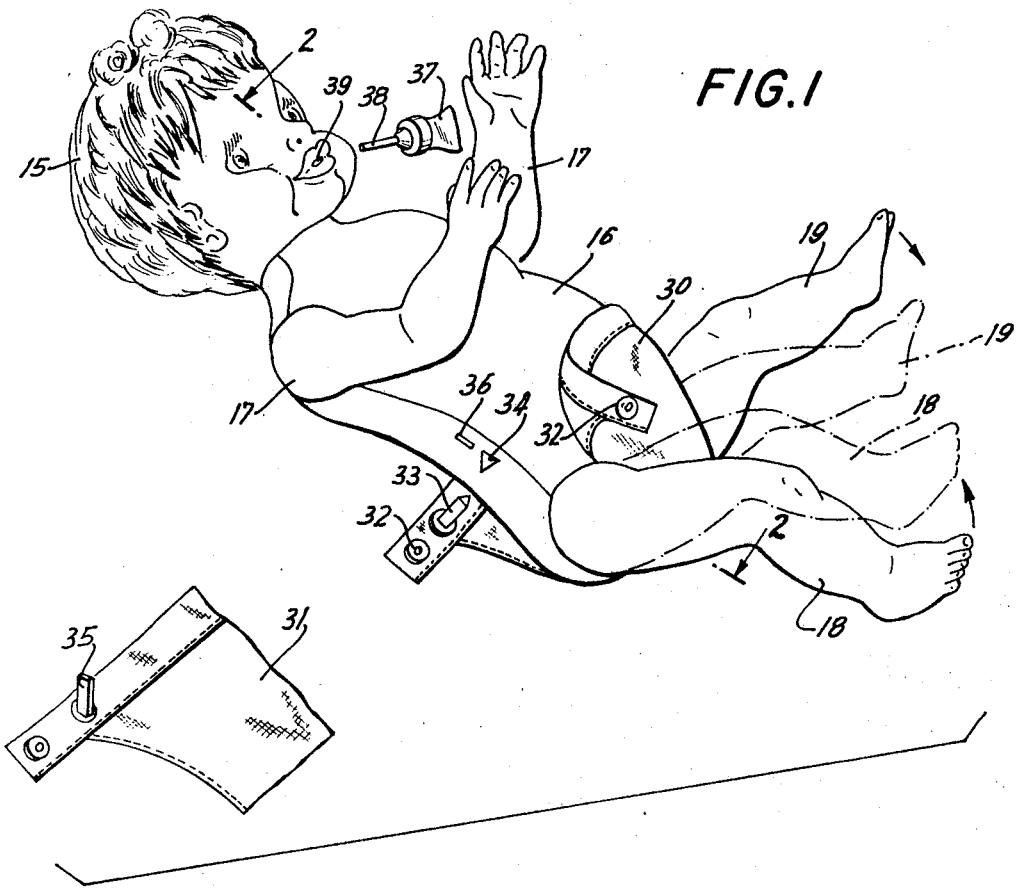
FIG.1
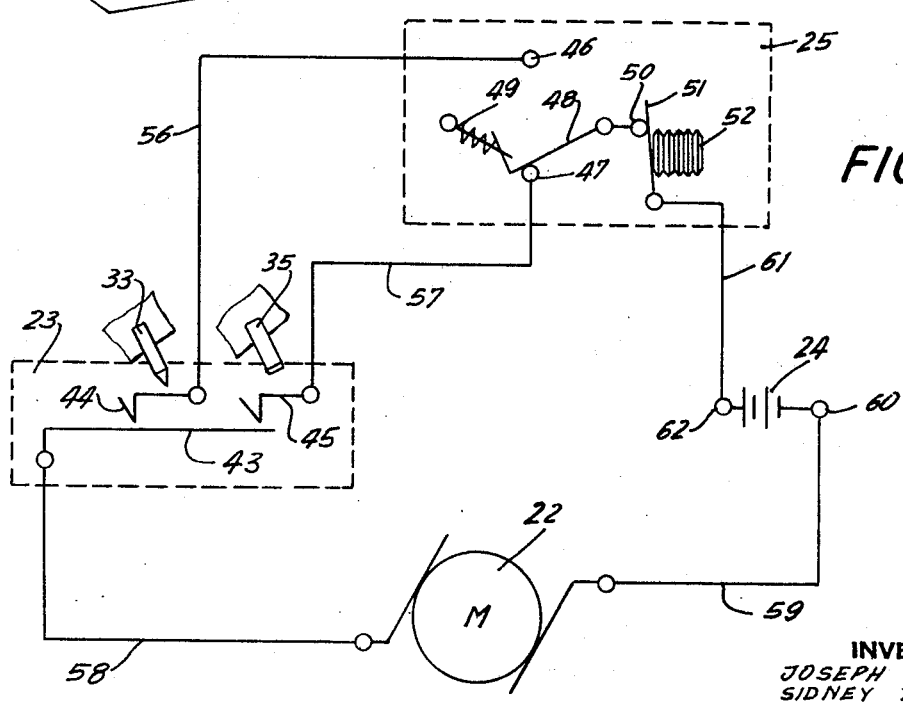
FIG.II

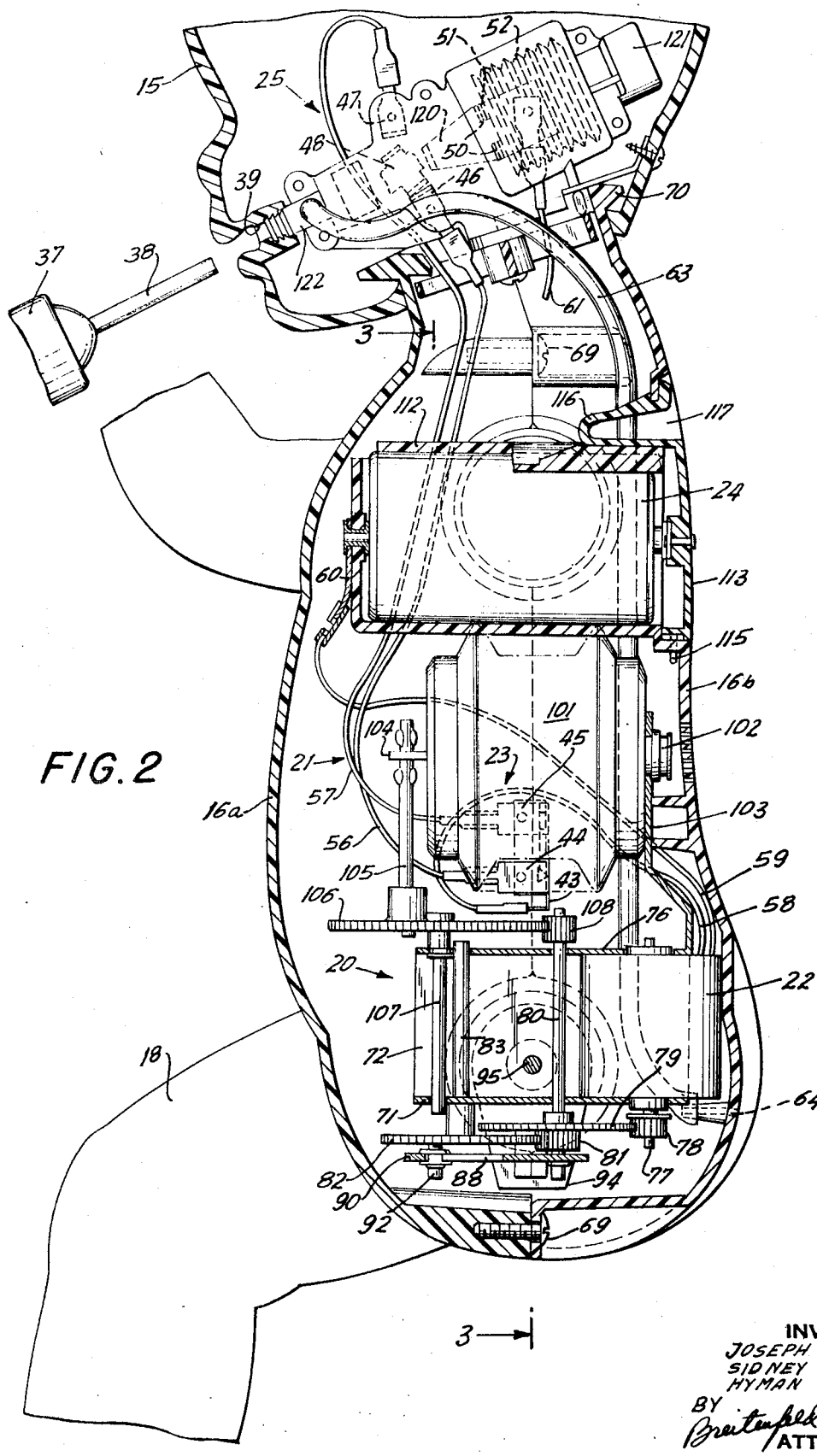

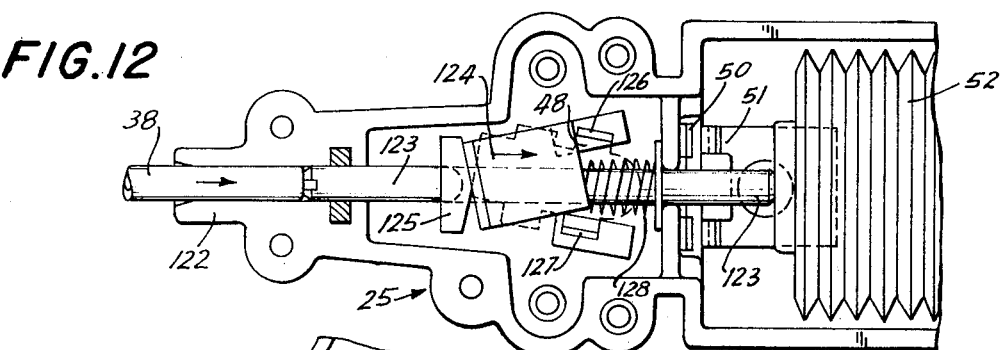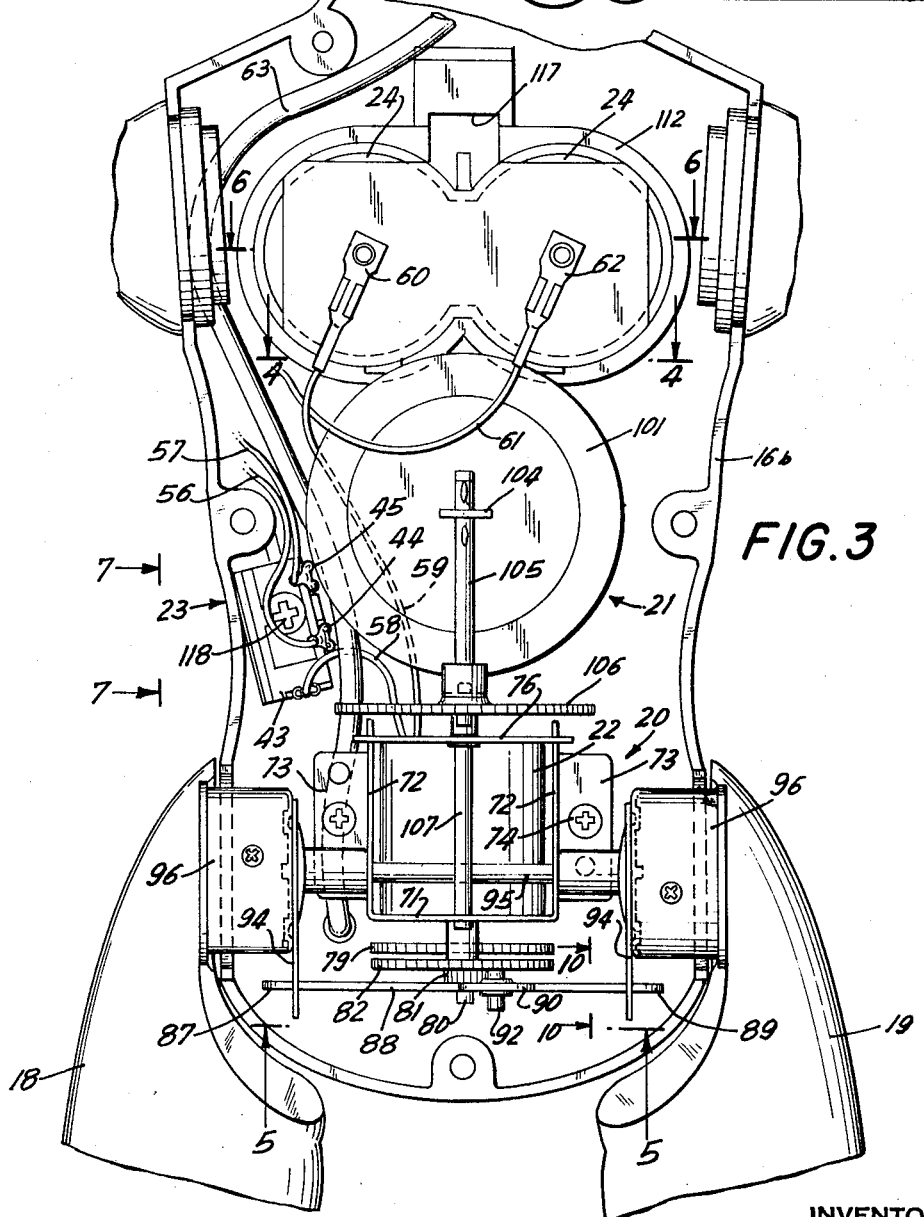

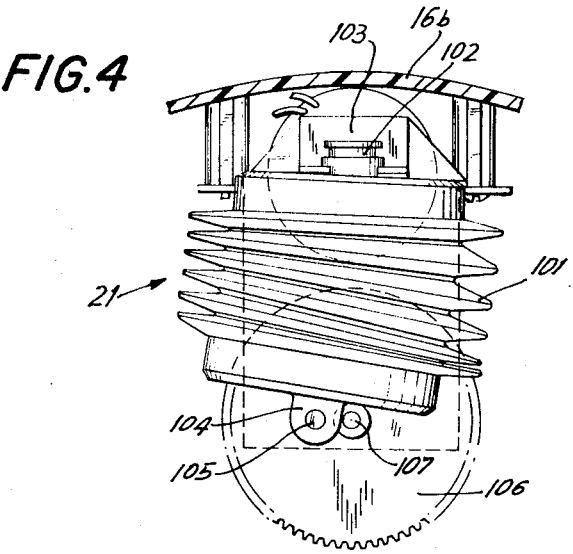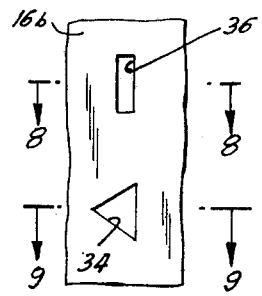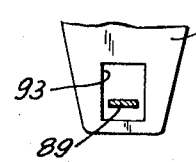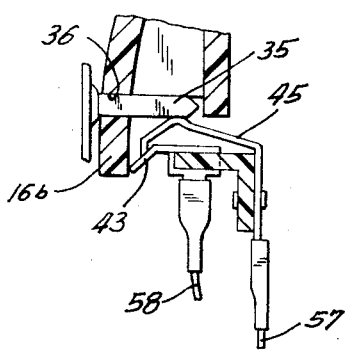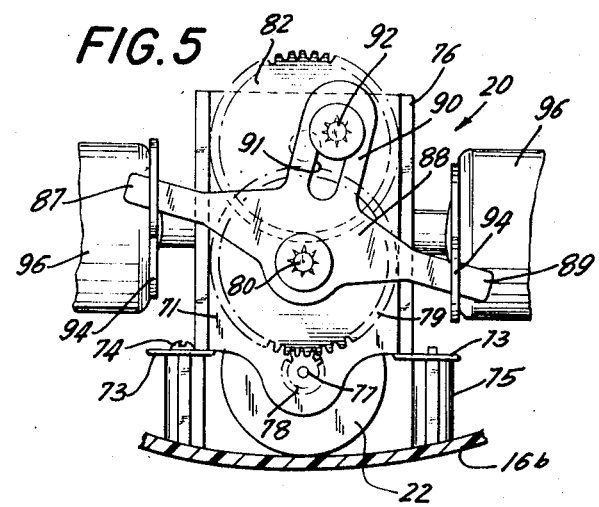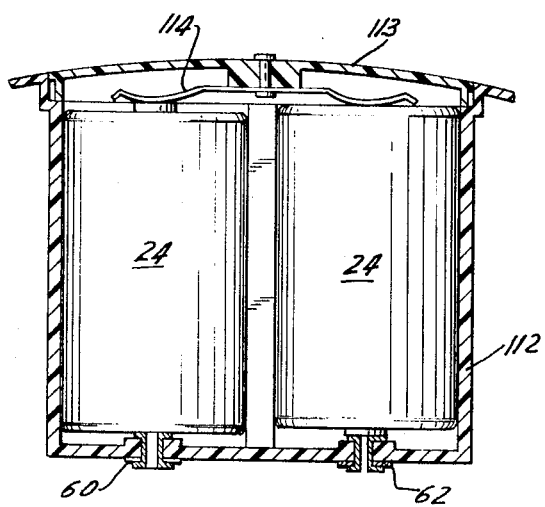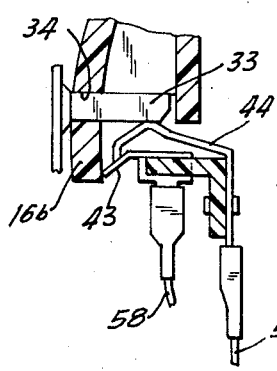

3,514,899
DOLL HAVING ELECTRICAL ACTION-PRODUCING MECHANISM RESPONSIVE TO ACTUATORS ON SEPARATE ARTICLES
Joseph L. Bonanno, South Orange, Sidney Tepper, Millburn, and Hyman Boydman, Springfield, N.J., assignors to Topper Corporation, a corporation of Delaware
Filed Apr. 26, 1968, Ser. No. 724,400
Int. Cl. A63h 33/26
U.S. Cl. 46—232    16 Claims

ABSTRACT OF THE DISCLOSURE

Doll has electrical action mechanism, e.g., motor-operated crying and/or appendage-moving mechanism, and circuit for energizing mechanism. Circuit includes two parallel current paths, and a switch means at each end of the current paths for alternatively connecting one or the other path to the remainder of the circuit. One switch means may be a single pole, double throw switch behind the doll's mouth operable by a nursing bottle, and other switch means may comprise two switches in doll's body operable alternatively by elements carried by garments, e.g., diapers, placed on the doll.

---

This invention relates to dolls, and more particularly to a doll provided within its hollow body with an electrically operable action-producing mechanism.

It is an object of the invention to provide a doll capable of responding to a stimulus applied by a child in a manner comparable to the response which would be expected of a real baby.

It is a more specific object of the invention to provide a doll which may be fed by means of a simulated nursing bottle and which, after the bottle nipple is removed from its mouth, cries and kicks its feet until the diaper it is wearing, which may have become wet with the fluid fed to the doll, is changed.

It is a further object of the invention to provide such a doll with switches intended to be operated in a particular sequence to achieve the expected response from the doll, and switch actuators specially designed to guide the child in operating the switches in the proper sequence.

According to a preferred embodiment of the invention, a doll is provided within its hollow body with an electric motor which, when energized, simultaneously operates a crying mechanism and a feet-kicking mechanism. An electric circuit within the doll for energizing the motor includes a battery power source, two parallel current paths, and switch means at each end of the current paths for alternatively connecting one or the other of the current paths to the remainder of the circuit, so as to complete the circuit and energize the motor. One switch means is located in the doll's head and, at any given time, connects the end of one of the parallel current paths to the remainder of the circuit. By inserting the nipple of a simulated nursing bottle into the doll's mouth, the switch can be shifted to connect the end of the other current path to the circuit.

The other switch means includes a normally open switch associated with each current path, and each switch may be closed, to connect its respective current path to the circuit, by inserting an element carried by a piece of apparel, such as a diaper, through one of two holes in the doll's torso. Two diapers are provided, and the elements carried by each are shaped so that they can each be inserted through a different one of the holes. Thus, with one diaper in place, the bottle may be used to feed the doll and shift the switch in the doll's head so that both ends of the same current path will be connected to the remainder of the circuit. While the nipple is in the doll's mouth, an additional switch is opened to prevent completion of the circuit. However, upon removal of the nipple, the circuit is completed, if desired after a time delay, and the motor is energized. The circuit is broken by removing the diaper and replacing it with the other diaper which conditions the circuit to be completed after the next insertion and removal of the bottle nipple.

Additional objects and advantages of the invention will be apparent from the following description in which reference is made to the accompanying drawings.

In the drawings:

FIG. 1 is a perspective view of a doll incorporating the present invention;

FIG. 2 is a fragmentary, longitudinal cross-sectional view taken along line 2—2 of FIG. 1;

FIG. 3 is a longitudinal cross-sectional view taken along line 3—3 of FIG. 2;

FIG. 4 is a transverse cross-sectional view taken along line 4—4 of FIG. 3;

FIG. 5 is a transverse cross-sectional view taken along line 5—5 of FIG. 3;

FIG. 6 is a transverse cross-sectional view taken along line 6—6 of FIG. 3;

FIG. 7 is a fragmentary elevational view taken along line 7—7 of FIG. 3;

FIG. 8 is a cross-sectional view taken along line 8—8 of FIG. 7;

FIG. 9 is a cross-sectional view taken along line 9—9 of FIG. 7;

FIG. 10 is a cross-sectional view taken along line 10—10 of FIG. 3;

FIG. 11 is a schematic diagram of the electrical circuit for operating the doll; and FIG. 12 is a fragmentary longitudinal cross-sectional view illustrating the switch means located in the doll's head.

The doll chosen to illustrate the present invention, and shown in the drawings, comprises generally a hollow body, including a head portion 15 and a torso portion 16, arms 17 mounted on the torso 16 in any conventional way, and legs 18 and 19 mounted for swinging movement with respect to the torso portion 16.

Housed within the lower region of the torso 16 is an action mechanism including, in the present example, a leg-swinging mechanism 20 (FIGS. 2, 3, and 5) and above it a crying mechanism 21 (FIGS. 2, 3, and 4). Both mechanisms are actuated by a single electric motor 22 (FIGS. 2, 5 and 11). Mounted against the inner surface of the torso side wall, and to one side of the crying mechanism 21, is a switch means 23 (FIGS. 2, 3, and 11), and above the crying mechanism are two batteries 24 (FIGS. 2, 3, 6, and 11) constituting a power source for energizing the motor 22. Within the head 15 is another switch means 25 (FIGS. 2 and 11), and suitable wiring is provided for interconnecting the switch means 23, 25, the batteries 24, and the motor 22 in a special circuit relationship (FIG. 11).

Two interchangeable simulated diapers 30 and 31 (FIG. 1) are provided (only a fragment of diaper 31 being shown) for covering the lower torso area, and each may be temporarily secured in place by snap fasteners 32. Diaper 30 carries a pin 33 in one corner, the pin 33 in the present example having a triangular cross-sectional shape and being adapted for insertion into a correspondingly shaped hole 34 in the side wall of torso 16. The hole 34 is located opposite the switch means 23, and insertion of the pin 33 into hole 34 serves to actuate the switch means, as will be described in more detail below. Diaper 31 also carries a pin 35 in one corner, this pin having a rectangular cross-sectional shape and being adapted for insertion into a correspondingly shaped hole 36 located alongside hole 34. Insertion of the pin 35 into hole 36 also serves to actuate the switch means 23. The pins 33 and 35 are so relatively proportioned that each will be accommodated only within its correspondingly shaped hole; therefore, pin 33 cannot be inserted into hole 36 and pin 35 cannot be inserted into hole 34. A simulated nursing bottle 37 (FIGS. 1 and 2) is provided having a relatively rigid nipple 38 adapted to be inserted into a hole 39 in the mouth of the doll. The switch means 25 is located behind the hole 39 and is actuated in a manner to be described each time the nipple is pushed through the hole.

Before proceeding further with this description, it is believed that the reader's understanding of the invention will be enhanced by a recital, with reference to FIGS. 1 and 11, of the manner in which the illustrative doll is used. By way of preparation, it should be mentioned that the switch means 23 includes a stationary contact 43, and two movable contacts 44 and 45 normally spaced from the stationary contact. The switch means 25 includes a single-pole, double-throw switch comprising two stationary contacts 46 and 47, and a movable contact 48 swingable between the two stationary contacts. The contact 48 forms part of a toggle arrangement including also a compression spring 49 surrounding a pivotally mounted stem arranged to be slidably held by an extension projecting from the contact 48. The spring 49 biases the contact 48 alternatively against one or the other of the stationary contacts 46 and 47, the contact 48 being shifted from one stationary contact to the other each time the nipple 38 is pushed through the hole 39 in the doll's mouth. The switch means 25 also includes a normally closed switch comprising a stationary contact 50, a movable contact 51, and a member 52 for biasing the contact 51 against the contact 50. The member 52 may be a bellows, as shown, for providing a delayed-action reclosing of the switch 50, 51.

Two parallel current paths extend between the two switch means 23 and 25, one path being a wire 56 connected between movable contact 44 of switch means 23 and stationary contact 46 of switch means 25, and the other path being a wire 57 connected between movable contact 45 and stationary contact 47. The remainder of the electric circuit within the doll involves a single current path comprising a wire 58 between the stationary contact 43 of switch means 23 and the motor 22, a wire 59 between motor 22 and one terminal 60 of the power source 24, and a wire 61 between the other terminal 62 of the power source and the movable contact 51 of the normally closed switch.

When the child wishes to play with the doll, one of the diapers, say the diaper 30, is applied to the doll by inserting the pin 33 into the hole 34, wrapping the diaper around the lower torso, and snapping the fasteners 32 together. The pin 33 serves to shift the movable contact 44 of the switch means 23 into engagement with the stationary contact 43, but this does not result in a complete circuit (assuming the parts are in the condition shown in FIG. 11) and hence there is no reaction from the doll. The nipple 38 is then pushed into the hole 39, to simulate feeding the doll, far enough to simultaneously (1) effect a shift of the contact 48 out of engagement with the contact 47 and into engagement with the contact 46, and (2) push the contact 51 away from contact 50 against the force of bellows 52. Because the switch 50, 51 is open, the doll still does not react. If there is a liquid, such as water, in the bottle 37, the liquid will flow through the nipple 38 into the doll's mouth, and from there through the tube 63 (FIGS. 2 and 3) to an outlet hole 64 at the lower end of torso 16 whereupon, the diaper 30 becomes wet.

As long as the nipple 38 remains in the hole 39, the doll remains placid. However, upon removal of the nipple from the hole, the bellows 52 is allowed to return the contact 51 to a position in which it engages contact 50. A circuit is thereby completed from terminal 62 of battery source 24, through wire 61, contacts 50 and 51, contacts 48 and 46, wire 56 (one of the parallel current paths) contacts 44 and 43, wire 58, motor 22, and wire 59, back to terminal 60 of the source 24, whereupon the motor is energized. As a result, the doll begins to cry and kick its legs. The child can attempt to comfort the doll by hugging or rocking it, but this will not terminate the doll's fussing. The child may then inspect the diaper 30, find it wet, and remove it, at the same time pulling the pin 33 from the hole 34, thus allowing the contact 44 to spring away from contact 43 and open the circuit. Of course, the doll immediately becomes placid again, giving the illusion that it was uncomfortable because of its wet diaper. (It will be appreciated that the dampness of the diaper really has no effect on the operation of the circuit as described above. The ability of the doll to wet its diaper is provided for only to enhance the realism of the doll's reaction, but the doll operates precisely as described above even if no liquid is contained in the bottle 37 and the diaper remains dry.)

The child then rediapers the doll with the fresh diaper 31, at the same time pushing the pin 35 into the hole 36, causing the contact 45 to shift into engagement with contact 43. The other parallel current path 57 is now connected to the remainder of the circuit through contacts 45 and 43 (but there is not yet a complete circuit), and conditions the circuit for completion following the next insertion of the nipple 38 into the hole 39 and its subsequent removal therefrom. The circuit will then be completed as before, except that instead of current flowing through wire 56 and contacts 44 and 46, it flows through wire 57 and contacts 45 and 47. The motor 22 will be energized causing the doll to fuss, and upon removal of the diaper 31 involving removal of the pin 35 from hole 36, the circuit is again opened. Placing the original diaper 30 on the doll, and inserting the pin 33 into hole 34, will condition the circuit again for completion through wire 56, and the circuit will be completed after the nipple is again pushed into and removed from the hole 39. Thus, it will be seen that the wires 56 and 57 serve as alternatives parallel current paths through which the circuit is alternately completed upon successive diaper changes and doll feedings.

The various components of the illustrated embodiment will now be described in greater detail with reference to FIGS. 2–10. The torso portion 16 of the doll body is formed of front and back portions 16a and 16b, respectively, of rigid material, joined by screws 69. The head portion 15 may be of flexible material, and is joined to the torso 16 by an outwardly projecting flange 70 at the upper end of the neck.

The leg swinging mechanism 20 is carried by a U-shaped bracket having a lower central portion 71 (FIGS. 2, 3, and 5) and two upstanding parallel arms 72. The rear edges of the arms 72 present outwardly propecting flanges 73, and screws 74 passing through holes in the flanges 73 and into posts 75 (FIG. 5) integral with the back portion 16b of the torso secure the bracket to the back torso portion. A top plate 76 is secured to the upper edges of the bracket arms 72, and the motor 22 is mounted between the plate 76 and portion 71 of the bracket. The motor shaft 77 projects through and below the bracket portion 71, and carries a pinion 78 which meshes with a spur gear 79 fixed to a vertical shaft 80 (FIGS. 2 and 5) extending upwardly through, and journalled in, the bracket portion 71 and plate 76. Also fixed to the shaft 80, adjacent to gear 79, is a pinion 81 meshing with a spur gear 82 mounted for rotation on a vertical support rod 83 (FIG. 2.)

A rocker member 88 (FIGS. 2, 3, and 5) is pivotally carried by the shaft 80, i.e., the member 88 does not rotate with the shaft 80, and presents two lateral arms 87 and 89 extending in opposite directions, and a head 90 formed with an elongated slot 91. Slidably accommodated within the slot 91 is a pin 92 projecting downwardly from the gear 82, the pin being located eccentrically on the gear. The free end of each of the arms 87 and 89 passes through an enlarged opening 93 (FIG. 10) in a plate 94 pivotally mounted on a horizontal rod 95 supported by the bracket arms 72, one plate 94 being allocated to each leg 18 and 19 of the doll. Each plate 94 engages a cup-shaped element 96 in driving relationship, and each cup 96 is fastened by screws to the upper end of its respective leg 18 or 19, the joint represented by the cup and leg interconnection passing through a hole provided in the torso 16.

When the motor 22 is energized causing its shaft 77 to rotate, the pinion 78 is rotated causing in turn the rotation of gear 79, pinion 81, and gear 82 carrying the eccentric pin 92. Engagement of the pin 92 within the slot 91 enables the pin to transmit its motion to the rocker member 88 and cause the latter to oscillate about the shaft 80. As a result, the arms 87 and 89 move back and forth, the arm 87 moving forward as the arm 89 moves back, and vice versa. Specifically, as the arm 87 moves forward, it pivots its respective plate 94 in a clockwise direction in FIG. 2, thereby causing the leg 18 to swing forwardly; at the same time, movement of arm 89 rearwardly pivots its associated plate 94 in counterclockwise direction causing the leg 19 to swing rearwardly. As the rocker 88 continues to oscillate, the arm 87 and leg 18 will swing rearwardly while the arm 89 and leg 19 swing forwardly. The cycle described above is then repeated, resulting in the appearance of the doll kicking its feet.

The crying mechanism 21 (FIGS. 2–4) includes a bellows 101 having a conventional air-actuated noise-maker 102 at one end, mounted on an extension 103 projecting upwardly from the rearward edge of the plate 76. The opposite end of the bellows 101 carries a tab 104 through which one end of a pin 105 extends. The other end of the pin is eccentrically fixed to a gear 106 rotatably mounted on a rod 107 carried by the bracket portion 71 and plate 76. The gear 106 meshes with a pinion 108 fixed to and rotatable with the shaft 80. Thus, when the motor is energized causing the shaft 80 to rotate via pinion 78 and gear 79, pinion 108 is rotated resulting in the rotation of gear 106. The pin 105 therefore moves the tab-carrying end of the bellows 101 forward and back (up and down in FIG. 4) causing repeated movements of air through the noise-maker 102 thereby simulating a crying sound.

The doll of the present example accommodates two flashlight batteries 24 (FIGS. 2, 3, and 6) within a housing 112 formed integral with the back portion 16b of the torso and projecting forwardly therefrom. The forward end of the housing 112 is substantially closed and carries the terminals 60 and 62 fitted on metal grommets passing through the housing end wall and contacting the terminals of the batteries 24. The open rear end of the housing is closed by a removable cover 113 which carries a metal strip 114 for interconnecting the battery terminals located at the rear. The cover 113 is held in place by two tabs 115 (FIG. 2) projecting downwardly from its lower edge through holes in the wall of housing 112, and by an integrally formed resilient latch 116 adapted to snap into a notch 117 (see also FIG. 3) in the back torso portion 16b. Obviously, the cover 113 may be removed to replace the batteries 24.

The switch means 23 (FIGS. 2, 3, 8, and 9) includes the stationary contact 43 secured by a screw 118 to a post integral with the rear torso portion 16b. The same screw holds an L-shaped insulator 119 in place against the contact 43, the insulator carrying the two movable contacts 44 and 45. The contacts 44 and 45 are resilient and normally stand away from the stationary contact 43. As viewed in FIGS. 8 and 9, the movable contacts normally are spaced above the contact 43. However, when the pin 36 is pushed into the hole 36 (FIG. 8) it cams the contact 45 toward and into engagement with the contact 43. Upon removal of the pin 36, the contact 45 springs away from contact 43. Similarly, when pin 33 is pushed into hole 34 (FIG. 9), it cams the contact 44 into engagement with contact 43, and upon removal of the pin the contact 44 springs away from contact 43.

The switch means 25 (FIGS. 2 and 12) in the head 15, which is described and illustrated in detail in our copending application Ser. No. 724,401, filed the same date as this application, includes the two stationary contacts 46 and 47 and the movable contact 48 pivotally mounted for swinging movement between them. The mechanism for alternately shifting the movable contact between the two stationary contacts upon successive insertions of the nipple 38 into hole 39 includes a rod 123 extending from the tubular end 122 of the switch means 25 to the leftward end of the bellows 52. Between its ends, the rod 123 is formed with an abutment 125 having two working faces arranged at an obtuse angle to each other. These faces act alternatively on the base of a U-shaped member 124, the rod 123 passing through an enlarged hole in the base so that the member 124 may pivot with respect to the rod. In FIG. 12, the contact 48 has just been switched, to the position shown, by the force transmitted to it from the nipple 38 via the rod 123, the abutment 125, and the member 124, the latter having become tilted as shown upon engaging the upstanding ear 126 projecting laterally from movable contact 48. After removal of the nipple 38, the spring 128 returns the member 124, and rod 123 toward the left, and upon the next insertion of the nipple into the hole 39 and tubular portion 122, the member 124 will engage the ear 127 projecting from contact 48 and will swing the latter into engagement with the other stationary contact.

The stationary contact 50 of the normally closed switch remains in constant electrical engageable with movable contact 48 by means of an integral extension 120 which maintains a rubbing contact with movable contact 48. The movable contact 51, connected to the wire 61, is pressed against contact 50 by the resilient bellows 52, the latter having a tendency to expand longitudinally. If not for the bellows 52, the contact 51 would spring away from the contact 50.

When the nipple 38 is pushed into the hole 39, and into the tubular end 122 of the switch means aligned with the hole 39, this motion is transmitted by rod 123 to the leftward end (in FIG. 2) of the bellows 52 and the latter is thereby compressed, allowing the contact 51 to move away from the contact 50. As long as the nipple 38 remains in the hole 39, the bellows 52 is maintained compressed. When the nipple is removed, the bellows 52 expands longitudinally due to its inherent resilience, and again pushes the contact 51 against contact 50. In the present embodiment, a restricted opening is provided in the region 121 between the atmosphere and the interior of the bellows 52 so that air is permitted to enter the bellows at a very slow rate. Consequently, after removal of the nipple 38 from hole 39, the bellows 52 expands slowly, resulting in a time delay between removal of the nipple and engagement of the contacts 50 and 51. This time delay between removal of the nipple and closing the circuit for energizing the motor 22 gives the illusion that the doll wets its diaper, and hence starts fussing, a short while after feeding has been completed. The tube 63 which carries the liquid from the head 15 to the lower torso fits tightly at its upper end around a hollow stem projecting laterally from the tubular end 122 of the switch means 25, and fits tightly at its lower end around a hollow stem surrounding hole 64 and integral with the back torso portion 16b.

Although the preferred embodiment of the invention described above involves feeding a doll followed by its fussing, obviously the arrangement illustrated may be used to cause reactions other than kicking and crying to stimuli other than feeding. Thus, the member for operating the switch means 25 need not be a nursing bottle, and the members for operating the switch means 23 may be carried by pieces of apparel, other than diapers, e.g., articles of clothing, jewelry, etc.

The invention has been shown and described in preferred form only, and by way of example, and many variations may be made in the invention which will still be comprised within its spirit. It is understood, therefore, that the invention is not limited to any specific form or embodiment.

What is claimed is:
1. A doll comprising:
  (a) a hollow body,
  (b) a plurality of articles adapted to engage said doll, each of said articles carrying a switch actuator,
  (c) an electrically controlled action mechanism within said body for rendering said doll active,
  (d) plural means associated with said doll arranged for cooperation with said actuators, and
  (e) an electrical circuit carried by said body for energizing said mechanism including:
    (I) two parallel current paths carried by said body for alternatively completing said circuit and energizing said mechanism, and
    (II) switch means at each end of said parallel current paths operable by said actuators, said switch means at one end alternately positionable for connecting one or the other of said current paths to the remainder of said circuit in response to successive engagements of the doll by one of said actuators of said articles, said switch means at the other end alternatively positionable for connecting one or the other of said current paths to the remainder of said circuit depending upon which of said actuators of said remaining articles is brought into engagement with the roll,
whereby both switch means must be positioned to connect the same one of said current paths to the remainder of said circuit in order to activate said action mechanism, and operation of one of said switch means by one of said actuators is sufficient to open said circuit and deactivate said mechanism.

2. A doll as defined in claim 1 wherein said action mechanism is a crying mechanism including an electric motor.

3. A doll as defined in claim 1 wherein said action mechanism is an appendage-moving mechanism including an electric motor.

4. A doll as defined in claim 1 wherein said action mechanism includes an electric motor, a crying mechanism operated by said motor, and an appendage-moving mechanism operated by said motor.

5. A doll as defined in claim 1 wherein said electrical circuit includes a battery power source within said body.

6. A doll as defined in claim 1 wherein said plural means includes openings in said body, said switch means being mounted within said body in the vicinity of said openings, and said switch means being arranged for operation by said actuators when the latter are pushed through said openings from outside said body.

7. A doll as defined in claim 1 wherein one of said switch means includes two stationary contacts, one of said contacts being connected to each of said current paths, a movable contact forming part of said electrical circuit, spring means for alternatively biasing said movable contact into engagement with one or the other of said stationary contacts, and means for alternately moving said movable contact between said stationary contacts upon successive actuations of said one switch means.

8. A doll as defined in claim 7 wherein said one switch means is located within the head portion of said doll body, and wherein said plural means includes a hole in the mouth region of the head portion, said means for moving said movable contact being arranged in alignment with said hole, whereby said means may be actuated when one of said actuators is pushed through said hole.

9. A doll as defined in claim 8 said switch means at one end including an additional switch between said movable contact and the remainder of said electrical circuit, said additional switch being opened each time one of said actuators is pushed through said hole to actuate said one switch means, and means for reclosing said additional switch after removal of the actuator from said hole.

10. A doll as defined in claim 9 wherein said reclosing means delays closing said additional switch for a predetermined time after removal of said actuator from said hole.

11. A doll as defined in claim 1 wherein one of said switch means includes a stationary contact forming part of said electrical circuit, and two movable contacts, one of said movable contacts being connected to each of said current paths, and said plural means includes two openings, one of said movable contacts being movable with respect to said stationary contact by an actuator pushed through each of said openings, and each of said openings having a characteristic distinguishing it from the other of said openings.

12. A doll as defined in claim 11 wherein said distinguishing characteristic of each of said openings is its cross-sectional shape.

13. A doll as defined in claim 11 wherein said articles include two separate pieces of apparel adapted to be applied alternatively to said doll body over areas near said openings, and one of said actuators being carried by each of said pieces of apparel adapted to be inserted into one of said openings, each of said actuators having a distinguishing characteristic corresponding to the distinguishing characteristic of one of said openings.

14. A doll as defined in claim 13 wherein said distinguishing characteristic of each of said openings is its cross-sectional shape, and each of said actuators is so formed that it may be inserted into only the one of said openings having a corresponding shape.

15. A doll as defined in claim 1 wherein one of said switch means comprises a single-pole, double-throw (SPDT) switch located within the head portion of said doll body, and the other of said switch means comprises two normally open switches within the torso portion of said doll body, wherein said plural means includes the doll mouth and one of said actuators is insertable into the mouth, means responsive to successive insertions of said one actuator into the doll's mouth for moving said SPDT switch alternately between its two positions, and said articles including two pieces of apparel, each carrying another of said switch actuators, each said other switch actuator being capable of closing only one of said normally open switches, said pieces of apparel being separately applicable to said doll body so that either of said normally open switches may be closed as desired, whereby when one of said pieces of apparel is on said body so that one of said normally open switches is closed said SPDT switch may be moved to a position for completing said circuit by inserting said one actuator into the mouth of the doll, and said circuit may be opened by removing said one piece of apparel, whereupon applying said other apparel piece to said body conditions said circuit to be completed upon the next insertion of said actuator into the doll's mouth.

16. A doll as defined in claim 15 wherein said actuator insertable into the mouth of the doll is the nipple of a simulated nursing bottle, and said pieces of apparel are simulated diapers.

References Cited

UNITED STATES PATENTS

| | | | |
|---|---|---|---|
| 3,083,504 | 4/1963 | Abbott | 46—247 |
| 3,136,089 | 6/1964 | Gardel et al. | 46—141 XR |
| 3,162,980 | 12/1964 | Hellman | 46—232 |
| 3,190,037 | 6/1965 | Giordano | 46—232 XR |
| 3,190,038 | 6/1965 | Kardon | 46—232 |
| 3,229,421 | 1/1966 | Ostrander | 46—247 |
| 3,274,729 | 9/1966 | Refabert | 46—232 |
| 3,383,795 | 5/1968 | Ryan et al. | 46—141 XR |

F. BARRY SHAY, Primary Examiner

U.S. Cl. X.R.

46—118, 247